(12) United States Patent
Tajima

(10) Patent No.: US 9,889,741 B1
(45) Date of Patent: Feb. 13, 2018

(54) VEHICLE

(71) Applicant: SUBARU CORPORATION, Tokyo (JP)

(72) Inventor: Ryoichi Tajima, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 15/646,635

(22) Filed: Jul. 11, 2017

(30) Foreign Application Priority Data

Aug. 12, 2016 (JP) .................................. 2016-158628

(51) Int. Cl.
```
H02P 1/00      (2006.01)
B60L 3/00      (2006.01)
H02J 7/00      (2006.01)
H02P 27/08     (2006.01)
H02J 7/34      (2006.01)
B60L 11/18     (2006.01)
```

(52) U.S. Cl.
CPC .......... *B60L 3/0046* (2013.01); *H02J 7/0063* (2013.01); *B60L 11/1879* (2013.01); *B60L 2210/10* (2013.01); *B60L 2240/526* (2013.01); *B60Y 2200/91* (2013.01); *H02J 7/345* (2013.01); *H02J 2007/0067* (2013.01); *H02P 27/08* (2013.01)

(58) Field of Classification Search
CPC .. B60L 3/0007; B60L 3/04; B60L 3/12; B60L 3/0003; B60L 3/0046; B60L 3/0038; H01M 10/44; H01M 2010/4271; H02J 7/0068; H02P 1/00; H02P 6/00; H02P 6/14; H02P 7/00; H02P 31/00; H02P 27/04; H02P 27/06

USPC .......... 318/400.01, 700, 701, 727, 779, 799, 318/800, 801, 599, 795, 805, 806, 807; 700/255; 701/32.2; 340/3.41, 3.43, 436; 180/232; 363/21.1, 40, 44, 95, 120, 174, 363/175

See application file for complete search history.

(56) References Cited

U.S. PATENT DOCUMENTS

2014/0320047 A1* 10/2014 Sakata .................... B60L 11/18
                                                                     318/139
2015/0343904 A1* 12/2015 Ikeyama ............... B60L 3/0007
                                                                     701/22

FOREIGN PATENT DOCUMENTS

JP       2013-031329 A     2/2013
JP       2013-236456 A   11/2013

* cited by examiner

*Primary Examiner* — Antony M Paul
(74) *Attorney, Agent, or Firm* — McDermott Will & Emery LLP

(57) ABSTRACT

A vehicle includes a motor, a first battery, a smoothing condenser, a discharge circuit, a controller, and a collision detector. The controller allows the discharge circuit to perform high-speed discharge on at least a second condition out of a first condition and the second condition. The controller allows the discharge circuit to perform low-speed discharge on a third condition other than the first and the second conditions. The high-speed discharge includes discharging the charged charges of the smoothing condenser at a higher speed than a speed of the low-speed discharge. The first condition is a condition on which the controller senses the detection of the collision of the object by the collision detector. The second condition is a condition on which the controller senses an occurrence of abnormality that keeps the controller from sensing the detection of the collision of the object by the collision detector.

16 Claims, 3 Drawing Sheets

VEHICLE

CROSS-REFERENCE TO RELATED APPLICATIONS

The present application claims priority from Japanese Patent Application No. 2016-158628 filed on Aug. 12, 2016, the entire contents of which are hereby incorporated by reference.

BACKGROUND

The technology relates to a vehicle including a motor for traveling.

As a vehicle such as an automobile, an electric vehicle is widely known. The electric vehicle includes a motor for traveling. In the electric vehicle, as described in Japanese Unexamined Patent Application Publication (JP-A) Nos. 2013-31329 and 2013-236456, a smoothing condenser is coupled in parallel to a high-voltage battery. The high-voltage battery is utilized as a drive power supply of the motor. The electric vehicle is provided with a discharge circuit that causes discharge of charged charges of the smoothing condenser. As to the high-voltage battery, provided is a switch circuit that is called a contactor. The contactor is provided for electrical separation of the high-voltage battery from other circuitry including the smoothing condenser and the discharge circuit.

The contactor is turned OFF when the operation is brought to an ordinary stop. This causes the electrical separation of the high-voltage battery from other circuitry. The ordinary stop of the operation refers to an occasion on which the vehicle is switched from an operative state to an operation stopped state in accordance with a predetermined operation by a driver, e.g., an OFF operation of an ignition switch. Moreover, the contactor is turned OFF, not only with the ordinary stop of the operation, but also upon a detection of a collision of an object with the vehicle. This contributes to enhancement in safety against, for example, electric leakage or an electric shock.

When the contactor is turned OFF, the charged charges remain in the smoothing condenser. The discharge circuit is provided for the discharge of the remaining charged charges.

SUMMARY

Upon the detection of the collision of the object, it is desirable that the discharge circuit perform the discharge promptly for purposes of reduction of possibility of, for example, the electric leakage or the electric shock.

It is, however, to be noted that performing the discharge at a high speed causes an increase in heat generation of the discharge circuit. Specifically, setting short discharge time in consideration of the collision causes the discharge circuit to be relatively frequently brought to an excessively heated state on every occasion of the ordinary stop of the operation associated with, for example, the OFF operation of the ignition switch. This furthers an increase in a size or costs of the discharge circuit because of countermeasures against heat. In particular, adopting a configuration in which a discharge current is consumed by a resistor may involve using a resistor having a large rated power, i.e., a resistor of a large size. This furthers even more the increase in the size and the costs of the discharge circuit.

It is desirable to provide a vehicle that makes it possible to provide enhanced safety against electric leakage or an electric shock upon an occurrence of a collision, and to prevent frequent occurrences of excessive heat generation of a discharge circuit, to thereby restrain an increase in a size or costs of the discharge circuit.

An aspect of the technology provides a vehicle including a motor, a first battery, a smoothing condenser, a discharge circuit, a controller, and a collision detector. The first battery serves as a drive power supply of the motor. The smoothing condenser is coupled in parallel to the first battery. The discharge circuit is coupled in parallel to the smoothing condenser, and is able to discharge charged charges of the smoothing condenser. The controller controls operation of the discharge circuit. The collision detector makes a detection of a collision of an object.

The controller allows the discharge circuit to perform high-speed discharge on at least a second condition out of a first condition and the second condition. The controller allows the discharge circuit to perform low-speed discharge on a third condition other than the first condition and the second condition. The high-speed discharge includes discharging the charged charges of the smoothing condenser at a higher speed than a speed of the low-speed discharge. The first condition is a condition on which the controller senses the detection of the collision of the object by the collision detector. The second condition is a condition on which the controller senses an occurrence of abnormality that keeps the controller from sensing the detection of the collision of the object by the collision detector.

The controller may cause the high-speed discharge of the charged charges on each of the first condition and the second condition.

The vehicle may further include a second battery having an output voltage lower than an output voltage of the first battery. The controller may allow the discharge circuit to perform the high-speed discharge on the second condition. The second condition may include a condition on which the controller senses loss of power supply from the second battery.

The controller may allow the discharge circuit to perform the high-speed discharge on the second condition. The second condition may include a condition on which the controller senses an occurrence of abnormality in a communication channel. The communication channel may be provided for the sensing of the collision on the basis of a detection signal by the collision detector.

The discharge circuit may include a resistor and a discharge switch inserted in an inflow path of a discharge current from the smoothing condenser to the resistor. The controller may perform a pulse width modulation control of ON and OFF operation of the discharge switch, in allowing the discharge circuit to perform the low-speed discharge of the charged charges of the smoothing condenser.

DETAILED DESCRIPTION

[1. Overall Configuration of Vehicle]

Figure 1:
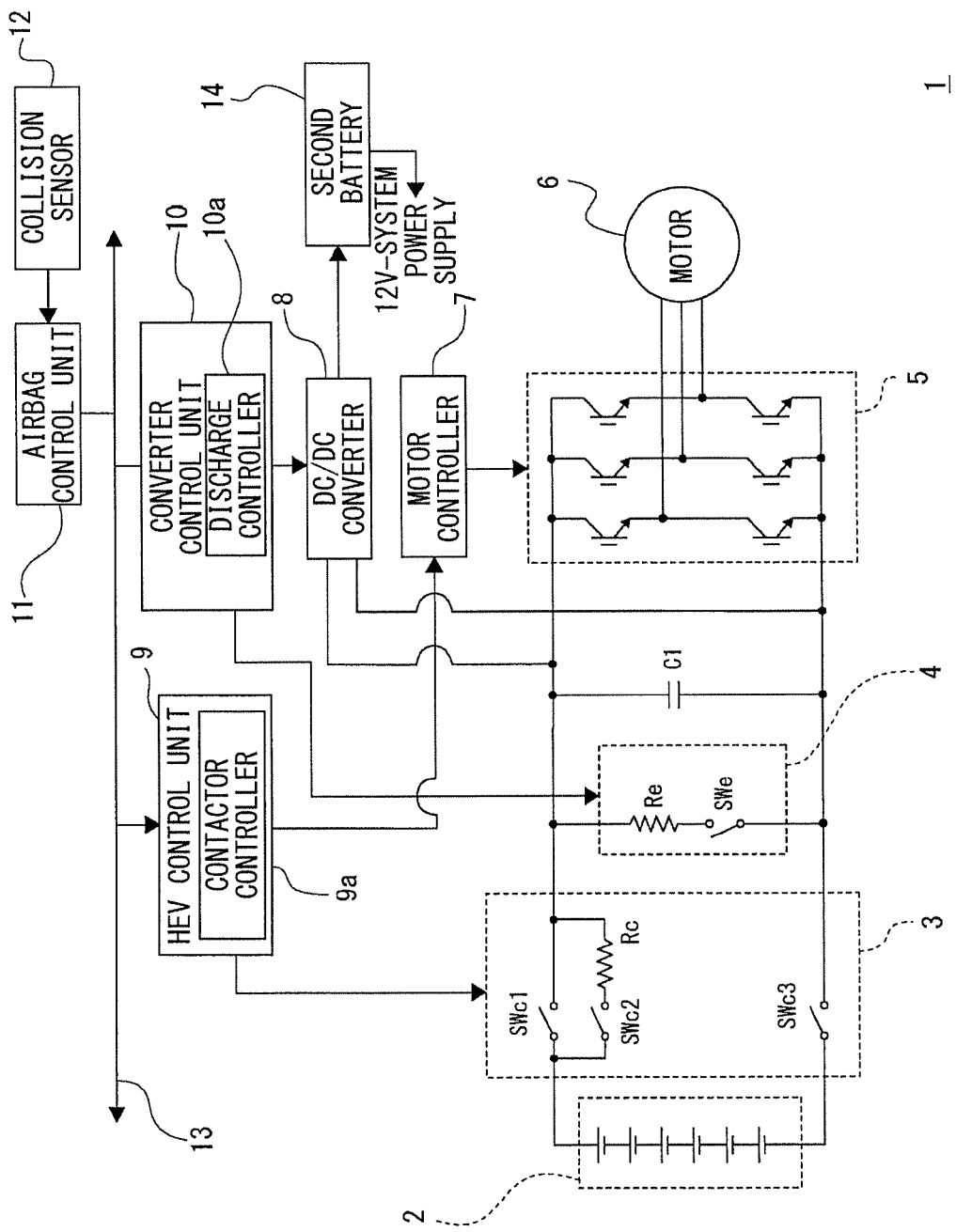
FIG. 1 is a circuit block diagram of a schematic configuration of a vehicle according to one implementation of the technology.

FIG. 1 is a circuit block diagram that illustrates a schematic configuration of a vehicle 1 according to one implementation of the technology. It is to be noted that FIG. 1 mainly illustrates solely an abstract of a configuration of a principal part related to this implementation, out of the configuration of the vehicle 1.

The vehicle 1 according to this implementation may be a hybrid vehicle that includes an undepicted engine and a motor 6. The engine and the motor 6 may serve as power sources that drive undepicted one or more wheels.

The vehicle 1 may include a first battery 2, a contactor 3, a smoothing condenser C1, a discharge circuit 4, and an inverter 5. The first battery 2 serves as a drive power supply of the motor 6. The contactor 3 may serve as a switch circuit that electrically separates the first battery 2 from other circuitry. The smoothing condenser C1 may be coupled in parallel to the first battery 2 through the contactor 3. The discharge circuit 4 is coupled in parallel to the smoothing condenser C1, and may be able to discharge charged charges of the smoothing condenser C1 in a state in which the first battery 2 is electrically separated by the contactor 3. The inverter 5 may generate a drive signal, i.e., a drive current, of the motor 6, with a terminal voltage of the smoothing condenser C1 serving as an input voltage, and thereby drive the motor 6.

The first battery 2 may include a plurality of battery cells. The battery cells may each include, for example but not limited to, a secondary battery such as a nickel hydrogen battery and a lithium ion battery. An output voltage of the first battery 2 may be a relatively high voltage, e.g., several hundred volts (V).

The contactor 3 may include switches SWc1, SWc2, and SWc3, and a resistor Rc. The switch SWc1 may be inserted between a positive-electrode-side terminal of the first battery 2 and a positive-electrode-side terminal of the smoothing condenser C1. The switch SWc3 may be inserted between a negative-electrode-side terminal of the first battery 2 and a negative-electrode-side terminal of the smoothing condenser C1. The switch SWc2 and the resistor Rc may be coupled in series. A series connection circuit of the switch SWc2 and the resistor Rc may be coupled in parallel to the switch SWc1.

The contactor 3 may have an ON state and an OFF state. The ON state refers to a state in which both the switch SWc1 and the switch SWc3 are turned ON. The OFF state refers to a state in which both the switch SWc1 and the switch SWc3 are turned OFF.

The smoothing condenser C1 may smooth an output current from the first battery 2, in a state in which the contactor 3 is in the ON state and electrically coupled to the first battery 2. The smoothing condenser C1 may be provided for an instantaneous output of a large current, upon ON and OFF operation of a switching element in the inverter 5.

The discharge circuit 4 may include a series connection circuit including a discharge resistor Re and a discharge switch SWe. The series connection circuit may be coupled in parallel to the smoothing condenser C1. The discharge switch SWe may be a switch inserted in an inflow path of a discharge current from the smoothing condenser C1 to the discharge resistor Re.

The inverter 5 may include the switching element in a plurality. The inverter 5 may interrupt a direct current inputted from the smoothing condenser C1, and generate alternating drive currents of three lines. The alternating drive currents may correspond to respective excitation phases of the motor 6 of a three-phase alternating-current system.

The vehicle 1 may further include a motor controller 7, a DC/DC converter 8, a hybrid electric vehicle (HEV) control unit 9, a converter control unit 10, an airbag control unit 11, a collision sensor 12, a bus 13, and a second battery 14.

The second battery 14 may include a secondary battery such as a lead storage battery, without limitation. The second battery 14 may be utilized as a drive power source of other auxiliaries than the motor 6. An output voltage of the second battery 14 may be lower than the output voltage of the first battery 2. For example, the output voltage of the second battery 14 may be about 12V. Non-limiting examples of the auxiliaries driven on the basis of the second battery 14 may include various on-vehicle control units such as the HEV control unit 9, and various on-vehicle sensors such as the collision sensor 12.

The motor controller 7 may control the ON and OFF operation of each of the switching elements in the inverter 5, on the basis of an instruction from the HEV control unit 9, and thereby perform a drive control of the motor 6.

The DC/DC converter 8 may include an insulated switching converter, without limitation. The DC/DC converter 8 may be supplied with the terminal voltage of the smoothing condenser C1, and step down the terminal voltage to about 12V. The step-down voltage obtained in the DC/DC converter 8 may be supplied as a power supply voltage for various undepicted auxiliaries provided on the vehicle 1, and be utilized for charging of the second battery 14. It is to be noted that non-limiting examples of the auxiliaries driven on the basis of the step-down voltage by the DC/DC converter 8 may include various electrical equipment such as lighting appliances, an air conditioner, and automatic windows.

The HEV control unit 9, the converter control unit 10, and the airbag control unit 11 may each include a microcomputer including a central processing unit (CPU), a read only memory (ROM), and a random access memory (RAM).

The HEV control unit 9, the converter control unit 10, and the airbag control unit 11 may be coupled through a bus 13, and be able to transmit or receive various signals to or from one another, or be able to share information with one another, through the bus 13. The bus 13 may be in conformity with a predetermined in-vehicle communication standard such as a controller area network (CAN).

The airbag control unit 11 may perform an operation control of an airbag provided in the vehicle 1, on the basis of a detection signal by the collision sensor 12. In this example, the collision sensor 12 may be an acceleration sensor that detects acceleration that acts on the vehicle 1, and the airbag control unit 11 may make a detection of a collision of an object with the vehicle 1, on the basis of the detection signal by the collision sensor 12, i.e., the acceleration sensor. In one specific but non-limiting example, when a value of the detection signal by the collision sensor 12, i.e., the acceleration sensor, is equal to or higher than a predetermined threshold, the airbag control unit 11 may send out, to the bus 13, a detection signal that indicates presence of the collision of the object. Hereinafter, the detection signal that indicates the presence of the collision of the object is referred to as a "collision detection signal". The collision detection signal thus sent out may be received by the HEV control unit 9 and the converter control unit 10.

The HEV control unit 9 may give, on the basis of an operation input of the driver and vehicle information such as accelerator opening, instructions to the motor controller 7 or an undepicted engine control unit, and thereby control operation of the vehicle 1. The engine control unit may be an on-vehicle control unit that performs an operation control of the engine.

The HEV control unit 9 may calculate, on the basis of a value of the accelerator opening, request torque T that corresponds to an amount of an operation of accelerator by the driver. The request torque T may be torque to be outputted to the one or more wheels. The HEV control unit 9 may allow the engine control unit and the motor controller 7 to execute the operation control of the engine and the motor 6, to make the vehicle 1 travel by requested drive power that corresponds to the request torque T. Traveling modes in the hybrid vehicle may include an electric vehicle (EV) traveling mode and a hybrid traveling mode. The HEV control unit 9 may switch these traveling modes in accordance with states of the vehicle 1. In the EV traveling mode, the HEV control unit 9 may calculate, on the basis of the request torque T, torque requested for the motor 6. The request torque T may be calculated on the basis of the value of the accelerator opening. The torque requested for the motor 6 is referred to as "request torque Tb". The HEV control unit 9 may instruct the motor controller 7 about the request torque Tb, to control the operation of the motor 6. In the hybrid traveling mode, the HEV control unit 9 may calculate torque requested for the engine and the request torque Tb, on the basis of the request torque T. The torque requested for the engine is referred to as "request torque Te". The HEV control unit 9 may instruct the engine control unit about the request torque Te, and instruct the motor controller 7 about the request torque Tb, to control the operation of the engine and the motor 6.

Moreover, the HEV control unit 9 may include a contactor controller 9a.

In one specific but non-limiting example, the contactor controller 9a may perform processing of turning OFF the contactor 3 in accordance with a predetermined sequence, when the vehicle 1 is switched from an operative state to an operation stopped state in accordance with a predetermined operation by the driver. Hereinafter, the case in which the vehicle 1 is switched from the operative state to the operation stopped state is referred to as "an ordinary stop of operation". Non-limiting examples of the predetermined operation by the driver may include an operation of turning OFF an ignition switch. Here, "turning OFF the contactor 3 in accordance with the predetermined sequence" means turning ON or OFF the switches SWc1, SWc2, and SWc3 in the contactor 3 in predetermined order and at predetermined timing. In this example, the processing of turning OFF the contactor 3 in accordance with the predetermined sequence may be carried out for purposes of prevention of, for example, a spark caused by instantaneously turning OFF both the switch SWc1 in an ON state and the switch SWc3 in an ON state, and for purposes of a check on welding of the switch SWc1 and the switch SWc3.

The contactor controller 9a may have a function of turning OFF the contactor 3 without following the predetermined sequence, in a case in which the HEV control unit 9 senses the collision of the object on the basis of the collision detection signal from the airbag control unit 11. In one specific but non-limiting example, the function may involve instantaneously turning OFF both the switch SWc1 and the switch SWc3.

Here, in a case in which the HEV control unit 9 suspends operation because of interruption of power or an occurrence of abnormality, the contactor 3 may be turned OFF without following the predetermined sequence. In other words, the switch SWc1 and the switch SWc3 may be turned OFF instantaneously. The interruption of power refers to a shut off of an operation power supply, or loss of power supply.

The converter control unit 10 may be an on-vehicle control unit that performs an operation control of the DC/DC converter 8. The converter control unit 10 in this example may include a discharge controller 10a. The discharge controller 10a may control discharge operation by the discharge circuit 4.

The converter control unit 10 may include electronic circuitry that serves as the discharge controller 10a. The electronic circuitry may be able to operate utilizing a power supply other than the second battery 14. In this example, the electronic circuitry may be able to be supplied, as an operation voltage, with an output voltage from, for example but not limited to, an undepicted small-sized battery such as a button battery, or with a direct current voltage generated by stepping-down of the terminal voltage of the smoothing condenser C1.

[2. Discharge Control Function According to Implementation]

Figure 2:
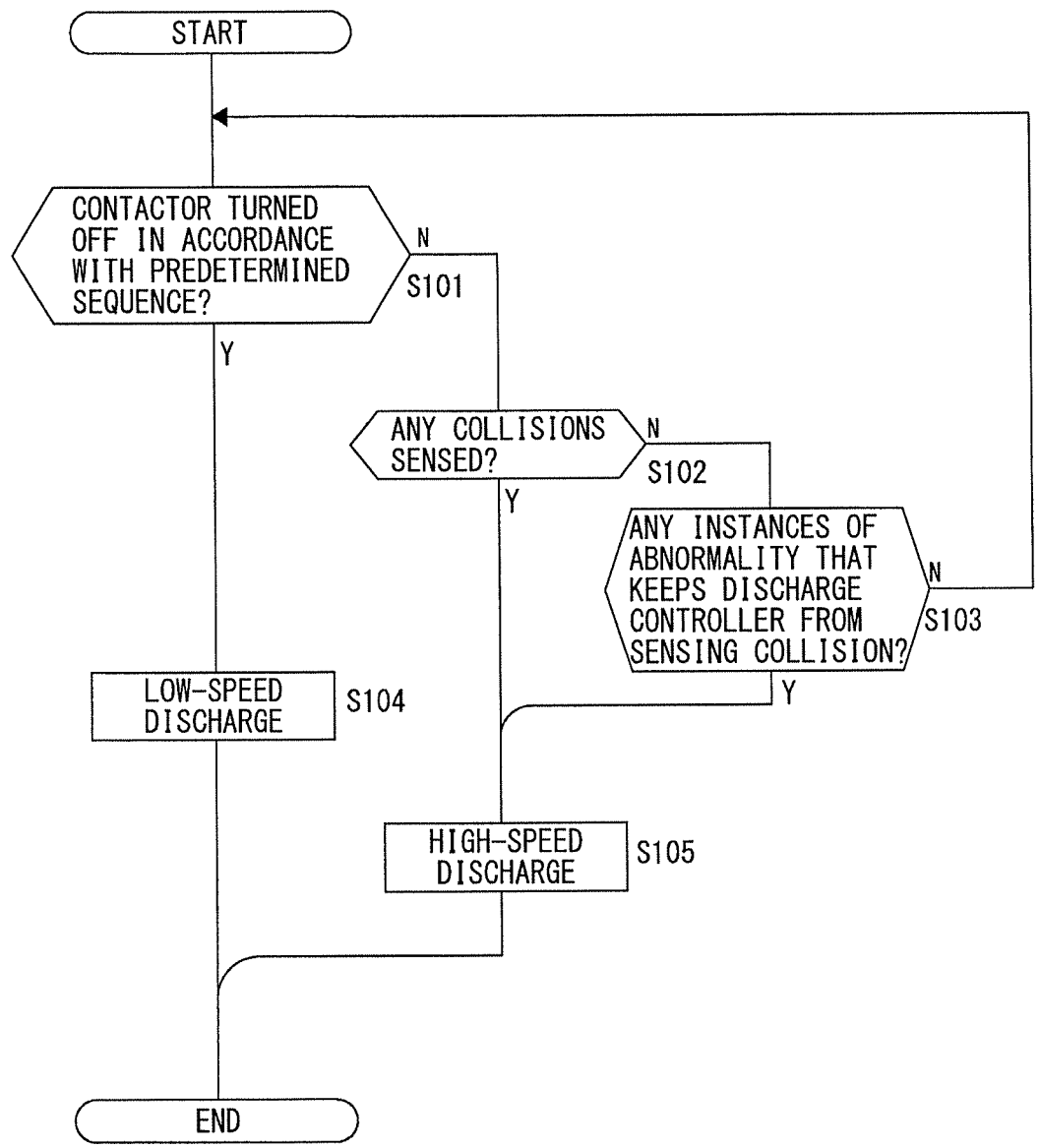
FIG. 2 is a flow chart of a procedure of processing related to a discharge control according to one implementation.

FIG. 2 is a flowchart that illustrates a procedure of processing related to a function of the discharge controller 10a in the converter control unit 10. It is to be noted that the converter control unit 10 may execute the processing illustrated in FIG. 2 in accordance with a program stored in a predetermined storage device such as the ROM provided in the converter control unit 10 itself.

The function as the discharge controller 10a may be realized not only by software processing but also by hardware.

In FIG. 2, the converter control unit 10 may determine, in step S101, whether or not the contactor 3 has been turned OFF in accordance with the predetermined sequence. In this example, the HEV control unit 9 may make a notification to the converter control unit 10, upon performing the processing of turning OFF the contactor 3 in accordance with the predetermined sequence. The processing in step S101 may be processing of determination on presence or absence of the notification.

It is to be noted that the following alternative determination processing may be carried out instead of the determination processing in step S101. The alternative determination processing may include determining whether or not the predetermined operation by the driver has been performed, and determining whether or not the contactor 3 is in the OFF state. The predetermined operation by the driver refers to an operation to give an instruction to switch the vehicle 1 from the operative state to the operation stopped state. Non-limiting examples of the predetermined operation by the driver may include the operation of turning OFF the ignition switch.

In step S101, in a case in which a determination is made that the contactor 3 has been turned OFF in accordance with the predetermined sequence (Y in step S101), the flow may proceed to step S104. In step S104, the converter control unit 10 may perform the low-speed discharge. As the low-speed discharge, the converter control unit 10 may perform processing of a pulse width modulation (PWM) control, over a predetermined period, of ON and OFF operation of the discharge switch SWe in the discharge circuit 4. This allows for the discharge at a lower speed than that of a case with the discharge switch SWe maintained in an ON state.

In accordance with the execution of the processing in step S104, the converter control unit 10 may finish the processing illustrated in FIG. 2.

In step S101, in a case in which a determination is made that the contactor 3 has been turned OFF without following the predetermined sequence (N in step S101), the flow may proceed to step S102. In step S102, the converter control unit 10 may determine whether or not there are any collisions sensed. In other words, the converter control unit 10 may determine whether or not the collision detection signal from the airbag control unit 11 has been sensed. In a case in which there are no collisions sensed (N in step S102), the flow may proceed to step S103. In step S103, the converter control unit 10 may determine whether or not there are any instances of abnormality that keeps the discharge controller 10a from sensing the collision. In a case with no instances of the abnormality (N in step S103), the flow may return to step S101. As described, the processing of steps S101, S102, and S103 may include standing by for any one of the following: the turning OFF of the contactor 3 in accordance with the predetermined sequence; the sensing of the collision; and an occurrence of the abnormality that keeps the discharge controller 10a from sensing the collision.

In a case in which the collision has been sensed (Y in step S102), the flow may proceed to step S105. In step S105, the converter control unit 10 may perform the high-speed discharge. That is, the converter control unit 10 may perform processing that includes making the discharge switch SWe in the discharge circuit 4 turned ON, i.e., processing that includes maintaining the discharge switch SWe in the ON state. This makes it possible to discharge the charged charges of the smoothing condenser C1 at a higher speed than that of the low-speed discharge.

Moreover, the converter control unit 10 may also perform the high-speed discharge in step S105, in a case in which a determination is made, in step S103, on the occurrence of the abnormality that keeps the discharge controller 10a from sensing the collision (Y in step S103).

Non-limiting examples of the abnormality that keeps the discharge controller 10a from sensing the collision may include loss of power supply from the second battery 14 and an occurrence of abnormality in the bus 13. In one implementation of the technology, the occurrence of the abnormality in the bus 13 may serve as an "occurrence of abnormality in a communication channel provided for sensing of a collision".

In a case with an occurrence of the collision of the object with the vehicle 1, e.g., a head-on collision of the vehicle 1 with another vehicle, there is possibility of loss of a 12V-system power supply because of, for example, damage to the second battery 14 disposed in, for example, an engine room of the vehicle 1. The loss of the 12V-system power supply may cause loss of power supply to the collision sensor 12 and the airbag control unit 11. It is, therefore, difficult to separate the collision of the object from the loss of the power supply from the second battery 14.

Moreover, the collision of the object may be accompanied by an occurrence of malfunction such as physical disconnection of part of the communication channel as the bus 13. Because the communication channel constituted by the bus 13 is utilized as the communication channel of the collision detection signal, the occurrence of the abnormality such as communication disturbance in the communication channel may keep the converter control unit 10 from sensing the collision. It is, therefore, difficult to separate the collision of the object from the abnormality in the communication channel.

For these reasons, the loss of the power supply from the second battery 14 and the occurrence of the abnormality in the bus 13 each correspond to one specific but non-limiting example of the "abnormality that keeps the controller from sensing the collision".

In step S103, the converter control unit 10 may determine presence or absence of the loss of the power supply from the second battery 14 and presence or absence of the occurrence of the abnormality in the bus 13. In a case in which a determination is made that neither has occurred, a result of the determination may be obtained on the absence of the "abnormality that keeps the controller from sensing the collision" (N in step S103).

In a case in which a determination is made on the presence of either the loss of the power supply from the second battery 14 or the occurrence of the abnormality in the bus 13, or both, a result of the determination may be obtained on the presence of the "abnormality that keeps the controller from sensing the collision" (Y in step S103).

As described, the high-speed discharge may be also performed in accordance with the occurrence of the "abnormality that keeps the controller from sensing the collision". This makes it possible to provide more enhanced safety against, for example, electric leakage or an electric shock, as compared to a case in which the high-speed discharge is performed solely in accordance with the sensing of the collision of the object.

The converter control unit 10 may finish the processing illustrated in FIG. 2 in accordance with the execution of the high-speed discharge in step S105.

It is to be noted that the "abnormality that keeps the controller from sensing the collision" is not limited to the two kinds of the abnormality as exemplified above.

For example, in the forgoing, description is given on an example of a configuration in which the converter control unit 10 is able to receive the collision detection signal directly from the bus 13. However, an alternative configuration may be adopted in which the converter control unit 10 may receive a notification of the occurrence of the collision through the HEV control unit 9. In this case, the converter control unit 10 may be kept from sensing the collision, in a case in which the HEV control unit 9 has abnormality. In other words, in this case, the abnormality in the HEV control unit 9 corresponds to one specific but non-limiting example of the "abnormality that keeps the controller from sensing the collision". At this occasion, an example of techniques of determining presence or absence of an occurrence of the abnormality in the HEV control unit 9 may be as follows. The converter control unit 10 may transmit a request signal regularly to the HEV control unit 9. The request signal may include a request for a reply regarding presence or absence of the abnormality. In a case with the reply of a signal indicating the presence of the abnormality, as a response signal to the request signal, the converter control unit 10 may determine the presence of the abnormality. The converter control unit 10 may also determine the presence of the abnormality, in a case with no reply of the response signal within predetermined time.

Moreover, the forgoing description gives an example in which the low-speed discharge involves performing the PWM control of the discharge switch SWe. However, the control to be involved in the low-speed discharge is not limited to the PWM control.

Figure 3:
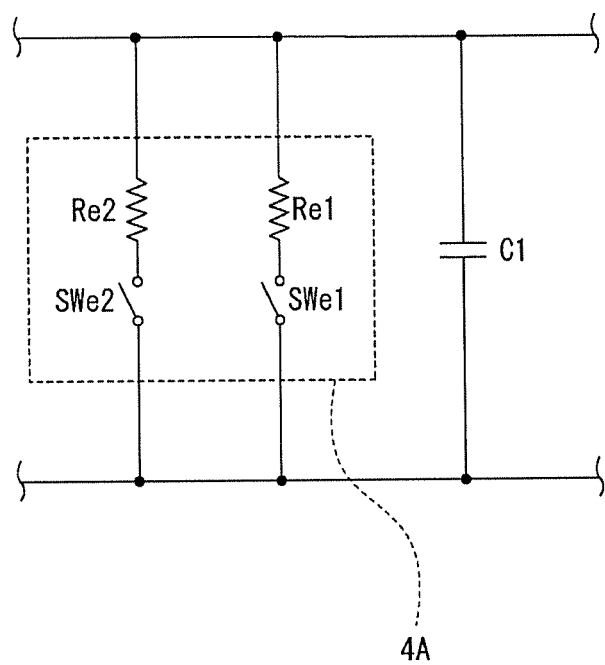
FIG. 3 illustrates one configuration of a discharge circuit according to a modification example.

FIG. 3 illustrates a configuration of a discharge circuit 4A according to a modification example.

Referring to FIG. 3, the discharge circuit 4A may include a series connection circuit including a first discharge resistor Re1 and a first discharge switch SWe1, and a series connection circuit including a second discharge resistor Re2 and a second discharge switch SWe2. The two series connection circuits may each be coupled in parallel to the smoothing condenser C1.

With the discharge circuit 4A as mentioned above provided, the high-speed discharge may involve performing processing of turning ON both the first discharge switch SWe1 and the second discharge switch SWe2. Meanwhile, the low-speed discharge may involve performing processing of turning ON either the first discharge switch SWe1 or the second discharge switch SWe2.

In one alternative, a resistance value of the first discharge resistor Re1 and a resistance value of the second discharge resistor Re2 may satisfy, for example, the following relation: "Re2>Re1". In this case, the high-speed discharge may involve performing processing of turning ON solely the first discharge switch SWe1, while the low-speed discharge may involve performing processing of turning ON solely the second discharge switch SWe2. It is to be noted that the relation between the resistance value of the first discharge resistor Re1 and the resistance value of the second discharge resistor Re2 may be in reverse to the forgoing relation. In this case, the high-speed discharge may involve performing processing of turning ON solely the second discharge switch SWe2, while the low-speed discharge may involve performing processing of turning ON solely the first discharge switch SWe1.

It is to be noted that in view of the enhanced safety against, for example, the electric leakage or the electric shock, it is not necessary to perform the high-speed discharge in accordance with the sensing of the collision of the object. One reason may be as follows. In the case with the occurrence of the collision of the object, there is considerably high possibility of the occurrence of the abnormality that keeps the discharge controller 10a from sensing the collision, e.g., the loss of the 12V-system power supply.

[3. Round-Up of Implementation]

As described, the vehicle 1 according to the implementation includes the motor 6 for traveling, the first battery 2, the smoothing condenser C1, the discharge circuit 4, the discharge controller 10a, the collision sensor 12, and the airbag control unit 11. In one implementation of the technology, the collision sensor 12 and the airbag control unit 11 may serve as a "collision detector", and make the detection of the collision of the object. The first battery 2 serves as the drive power supply of the motor 6. The smoothing condenser C1 is coupled in parallel to the first battery 2. The discharge circuit 4 is coupled in parallel to the smoothing condenser C1, and is able to discharge the charged charges of the smoothing condenser C1. The discharge controller 10a controls the operation of the discharge circuit 4.

The discharge controller 10a allows the discharge circuit 4 to perform the high-speed discharge of the charged charges of the smoothing condenser C1, on at least a second condition out of a first condition and the second condition. The first condition is a condition on which the discharge controller 10a senses the detection of the collision of the object with the vehicle 1 by the collision sensor 12 and the airbag control unit 11. The second condition is a condition on which the discharge controller 10a senses an occurrence of abnormality that keeps the discharge controller 10a from sensing the detection of the collision of the object by the collision sensor 12 and the airbag control unit 11. The discharge controller 10a allows the discharge circuit 4 to perform the low-speed discharge of the charged charges of the smoothing condenser C1, in need of discharge on a third condition other than the first condition and the second condition.

As described, the high-speed discharge of the charged charges of the smoothing condenser C1 is performed upon the occurrence of the abnormality that keeps the discharge controller 10a from sensing the collision. This makes it possible to provide the enhanced safety against, for example, the electric leakage or the electric shock. In the meanwhile, the low-speed discharge of the charged charges of the smoothing condenser C1 is performed in other cases that necessitate the discharge, e.g., the ordinary stop of the operation associated with the turning OFF of the ignition switch. This makes it possible to prevent frequent occurrences of excessive heat generation of the discharge circuit 4.

Thus, in the vehicle 1, it is possible to prevent the frequent occurrences of the excessive heat generation of the discharge circuit 4, while providing the enhanced safety against, for example, the electric leakage or the electric shock upon the occurrence of the collision. Hence, it is possible to restrain an increase in size and costs of the discharge circuit 4.

Moreover, in the vehicle 1 according to one implementation, the discharge controller 10a may cause the high-speed discharge of the charged charges of the smoothing condenser C1 on each of the first condition and the second condition.

Hence, it is possible to provide the more enhanced safety against, for example, the electric leakage or the electric shock.

Furthermore, the vehicle 1 according to one implementation may further include the second battery 14. The second battery 14 may have the output voltage lower than the output voltage of the first battery 2. The discharge controller 10a may allow the discharge circuit 4 to perform the high-speed discharge on the second condition. The second condition may include the condition on which the discharge controller 10a senses the loss of the power supply from the second battery 14.

The loss of the power supply from the second battery 14 may cause the possibility that the discharge controller 10a is kept from sensing the collision of the object with the vehicle 1. In other words, the condition on which the discharge controller 10a senses the loss of the power supply from the second battery 14 corresponds to one specific but non-limiting example of a condition that ought to be regarded as an equivalent to the occurrence of the collision of the object with the vehicle 1.

Accordingly, performing the high-speed discharge of the charged charges of the smoothing condenser C1 on such a condition makes it possible to provide the enhanced safety against, for example, the electric leakage or the electric shock upon the occurrence of the collision of the object with the vehicle 1.

In addition, in the vehicle 1 according to one implementation, the discharge controller 10a may allow the discharge circuit 4 to perform the high-speed discharge of the charged charges of the smoothing condenser C1 on the second condition. The second condition may include the condition on which the discharge controller 10a senses the abnormality in the bus 13. The bus 13 may serve as the "communication channel that is provided for the sensing of the collision on the basis of the detection signal by the collision detector".

The abnormality in the bus 13 that serves as the "communication channel provided for the sensing of the collision" corresponds to one specific but non-limiting example of the "abnormality that keeps the controller from sensing the detection of the collision of the object with the vehicle". Therefore, the case in which the discharge controller 10a senses the abnormality in the bus 13 corresponds to one specific but non-limiting example of the condition that ought to be regarded as the equivalent to the occurrence of the collision of the object with the vehicle 1.

Accordingly, performing the high-speed discharge of the charged charges of the smoothing condenser C1 on such a condition makes it possible to provide the enhanced safety against, for example, the electric leakage or the electric shock upon the occurrence of the collision of the object with the vehicle 1.

Moreover, in the vehicle 1 according to one implementation, the discharge circuit 4 may include the discharge resistor Re and the discharge switch SWe. The discharge resistor Re may serve as a "resistor" in one implementation of the technology. The discharge switch SWe may be inserted in the inflow path of the discharge current from the smoothing condenser C1 to the discharge resistor Re. The discharge controller 10a may perform the PWM control of the ON and OFF operation of the discharge switch SWe, in causing the low-speed discharge of the charged charges of the smoothing condenser C1.

This allows the discharge circuit 4 to include solely the one or more discharge resistors Re and the single discharge switch SWe, to perform switching between the high-speed discharge and the low-speed discharge.

Hence, it is possible to simplify the configuration of the discharge circuit 4, and to restrain the increase in the size and the costs.

[4. Modifications]

It is to be noted that the technology is by no means limited to the implementations described above. Various modifications and alterations may be made.

For example, in the forgoing, the loss of the power supply from the second battery 14 and the abnormality in the bus 13 are given as examples of the second condition. However, a case in which the contactor 3 has been turned OFF without following the predetermined sequence may be considered to be another example of the second condition. Upon the occurrence of the loss of the power supply from the second battery 14, the HEV control unit 9 that controls the contactor 3 gets into a state of loss of power supply. This causes the contactor 3 to be turned OFF without following the predetermined sequence. Accordingly, the case in which the contactor 3 has been turned OFF without following the predetermined sequence may be assumed to constitute an example of the case of the occurrence of the loss of the power supply from the second battery 14, and therefore, may be considered to be the second condition.

It is to be noted that in a case in which the high-speed discharge is performed in accordance with the sensing of the abnormality in the bus 13, there is possibility that the discharge circuit 4 may perform the high-speed discharge with the contactor 3 maintained in the ON state. Performing the high-speed discharge with the contactor 3 maintained in the ON state causes a large current from the first battery 2 to flow through the discharge resistor Re. This contributes to possibility of damage to the circuit. Accordingly, in the case in which the high-speed discharge is performed in accordance with the sensing of the abnormality in the bus 13, a check on a voltage value of the smoothing condenser C1 may be made. In a case in which the voltage value of the smoothing condenser C1 is not lowered in a predetermined mode, the discharge switch SWe may be restored to an OFF state, and the discharge may be stopped. For example, in a case in which the voltage value of the smoothing condenser C1 is lowered to a predetermined value or smaller within predetermined time from a start of the discharge, the discharge switch SWe may be restored to the OFF state, and the discharge may be stopped.

Moreover, in the forgoing, description is given on an exemplary case in which a functional unit that serves as the discharge controller 10a is mounted on the converter control unit 10. However, the functional unit that serves as the discharge controller 10a may be mounted on other targets than the converter control unit 10. For example, the functional unit may be mounted on the motor controller 7 or the HEV control unit 9, without limitation.

In the forgoing, description is given on an example in which the technology is applied to the hybrid vehicle. The technology may, however, be suitably applied to a wide range of vehicles including a motor for traveling, a first battery utilized as a drive power supply of the motor, and a smoothing condenser coupled in parallel to the first battery.

In one implementation described above, the discharge controller 10a illustrated in FIG. 1 may be implemented by circuitry including at least one semiconductor integrated circuit such as at least one processor (e.g., a central processing unit (CPU)), at least one application specific integrated circuit (ASIC), and/or at least one field programmable gate array (FPGA). At least one processor can be configured, by reading instructions from at least one machine readable tangible medium, to perform all or a part of functions of the discharge controller 10a. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the units illustrated in FIG. 1.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle, comprising:
   a motor;
   a first battery configured to serve as a drive power supply of the motor;
   a smoothing condenser coupled in parallel to the first battery;
   a discharge circuit that is coupled in parallel to the smoothing condenser, and is able to discharge charged charges of the smoothing condenser;
   a controller configured to control operation of the discharge circuit; and
   a collision detector configured to make a detection of a collision of an object,
   the controller allowing the discharge circuit to perform high-speed discharge on at least a second condition out of a first condition and the second condition, the controller allowing the discharge circuit to perform low-speed discharge on a third condition other than the first condition and the second condition, the high-speed discharge including discharging the charged charges of the smoothing condenser at a higher speed than a speed of the low-speed discharge, the first condition being a condition on which the controller senses the detection of the collision of the object by the collision detector, and the second condition being a condition on which the controller senses an occurrence of abnormality that keeps the controller from sensing the detection of the collision of the object by the collision detector.

2. The vehicle according to claim 1, wherein the controller causes the high-speed discharge of the charged charges on each of the first condition and the second condition.

3. The vehicle according to claim 2, further comprising a second battery having an output voltage lower than an output voltage of the first battery, wherein
the controller allows the discharge circuit to perform the high-speed discharge on the second condition, the second condition including a condition on which the controller senses loss of power supply from the second battery.

4. The vehicle according to claim 3, wherein
the controller allows the discharge circuit to perform the high-speed discharge on the second condition, the second condition including a condition on which the controller senses an occurrence of abnormality in a communication channel, and the communication channel being provided for the sensing of the collision on a basis of a detection signal by the collision detector.

5. The vehicle according to claim 3, wherein
the discharge circuit comprises:
a resistor; and
a discharge switch inserted in an inflow path of a discharge current from the smoothing condenser to the resistor, and
the controller performs a pulse width modulation control of ON and OFF operation of the discharge switch, in allowing the discharge circuit to perform the low-speed discharge of the charged charges of the smoothing condenser.

6. The vehicle according to claim 4, wherein
the discharge circuit comprises:
a resistor; and
a discharge switch inserted in an inflow path of a discharge current from the smoothing condenser to the resistor, and
the controller performs a pulse width modulation control of ON and OFF operation of the discharge switch, in allowing the discharge circuit to perform the low-speed discharge of the charged charges of the smoothing condenser.

7. The vehicle according to claim 2, wherein
the controller allows the discharge circuit to perform the high-speed discharge on the second condition, the second condition including a condition on which the controller senses an occurrence of abnormality in a communication channel, and the communication channel being provided for the sensing of the collision on a basis of a detection signal by the collision detector.

8. The vehicle according to claim 2, wherein
the discharge circuit comprises:
a resistor; and
a discharge switch inserted in an inflow path of a discharge current from the smoothing condenser to the resistor, and
the controller performs a pulse width modulation control of ON and OFF operation of the discharge switch, in allowing the discharge circuit to perform the low-speed discharge of the charged charges of the smoothing condenser.

9. The vehicle according to claim 7, wherein
the discharge circuit comprises:
a resistor; and
a discharge switch inserted in an inflow path of a discharge current from the smoothing condenser to the resistor, and
the controller performs a pulse width modulation control of ON and OFF operation of the discharge switch, in allowing the discharge circuit to perform the low-speed discharge of the charged charges of the smoothing condenser.

10. The vehicle according to claim 1, further comprising a second battery having an output voltage lower than an output voltage of the first battery, wherein
the controller allows the discharge circuit to perform the high-speed discharge on the second condition, the second condition including a condition on which the controller senses loss of power supply from the second battery.

11. The vehicle according to claim 10, wherein
the controller allows the discharge circuit to perform the high-speed discharge on the second condition, the second condition including a condition on which the controller senses an occurrence of abnormality in a communication channel, and the communication channel being provided for the sensing of the collision on a basis of a detection signal by the collision detector.

12. The vehicle according to claim 11, wherein
the discharge circuit comprises:
a resistor; and
a discharge switch inserted in an inflow path of a discharge current from the smoothing condenser to the resistor, and
the controller performs a pulse width modulation control of ON and OFF operation of the discharge switch, in allowing the discharge circuit to perform the low-speed discharge of the charged charges of the smoothing condenser.

13. The vehicle according to claim 10, wherein
the discharge circuit comprises:
a resistor; and
a discharge switch inserted in an inflow path of a discharge current from the smoothing condenser to the resistor, and
the controller performs a pulse width modulation control of ON and OFF operation of the discharge switch, in allowing the discharge circuit to perform the low-speed discharge of the charged charges of the smoothing condenser.

14. The vehicle according to claim 1, wherein
the controller allows the discharge circuit to perform the high-speed discharge on the second condition, the second condition including a condition on which the controller senses an occurrence of abnormality in a communication channel, and the communication channel being provided for the sensing of the collision on a basis of a detection signal by the collision detector.

15. The vehicle according to claim 14, wherein
the discharge circuit comprises:
a resistor; and
a discharge switch inserted in an inflow path of a discharge current from the smoothing condenser to the resistor, and
the controller performs a pulse width modulation control of ON and OFF operation of the discharge switch, in allowing the discharge circuit to perform the low-speed discharge of the charged charges of the smoothing condenser.

16. The vehicle according to claim 1, wherein
the discharge circuit comprises:
- a resistor; and
- a discharge switch inserted in an inflow path of a discharge current from the smoothing condenser to the resistor, and the controller performs a pulse width modulation control of ON and OFF operation of the discharge switch, in allowing the discharge circuit to perform the low-speed discharge of the charged charges of the smoothing condenser.

\* \* \* \* \*